United States Patent
Xu et al.

(10) Patent No.: US 11,915,432 B2
(45) Date of Patent: Feb. 27, 2024

(54) METHOD AND APPARATUS FOR TRACKING TARGET

(71) Applicant: Samsung Electronics Co., Ltd., Suwon-si (KR)

(72) Inventors: Jingtao Xu, Beijing (CN); Jiaqian Yu, Beijing (CN); Byung In Yoo, Seoul (KR); Chang Kyu Choi, Seongnam-si (KR); Hyunjeong Lee, Seoul (KR); Hangkai Tan, Beijing (CN); Jaejoon Han, Seoul (KR); Qiang Wang, Beijing (CN); Yiwei Chen, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 17/146,809

(22) Filed: Jan. 12, 2021

(65) Prior Publication Data

US 2021/0224564 A1 Jul. 22, 2021

(30) Foreign Application Priority Data

Jan. 16, 2020 (CN) .......................... 202010044865
Dec. 21, 2020 (KR) ........................ 10-2020-0179773

(51) Int. Cl.
*G06T 7/246* (2017.01)
*G06T 7/73* (2017.01)
(Continued)

(52) U.S. Cl.
CPC ............ *G06T 7/248* (2017.01); *G06F 18/241* (2023.01); *G06T 7/73* (2017.01); *G06V 10/25* (2022.01);
(Continued)

(58) Field of Classification Search
CPC ...... G06V 10/82; G06V 10/764; G06V 10/25; G06V 20/64; G06V 10/454; G06T 7/248; G06T 7/73; G06T 7/11
See application file for complete search history.

(56) References Cited

U.S. PATENT DOCUMENTS 5,408,270 A  4/1995 Lim
5,485,279 A  1/1996 Yonemitsu et al.
(Continued)

FOREIGN PATENT DOCUMENTS

CN        109726683 A    5/2019
KR  10-2016-0121481 A   10/2016
(Continued)

OTHER PUBLICATIONS

Guo, Guodong, et al., "Patch-based Image Correlation with Rapid Filtering", *2007 IEEE Conference on Computer Vision and Pattern Recognition*. IEEE, 2007 (pp. 1-7).
(Continued)

*Primary Examiner* — Margaret G Mastrodonato
(74) *Attorney, Agent, or Firm* — NSIP Law

(57) ABSTRACT

Disclosed is a target tracking method and apparatus. The target tracking apparatus includes a processor configured to obtain a first depth feature from a target region image and obtain a second depth feature from a search region image, obtain a global response diagram between the first depth feature and the second depth feature, acquire temporary bounding box information based on the global response diagram, updated the second depth feature based on the temporary bounding box information, obtain local feature blocks based on the first depth feature, obtain a local response diagram based on the local feature blocks and the updated second depth feature, and determine output bounding box information based on the local response diagram.

21 Claims, 13 Drawing Sheets

(51) Int. Cl.
*G06F 18/241* (2023.01)
*G06V 10/25* (2022.01)
*G06V 10/764* (2022.01)
*G06V 10/82* (2022.01)
*G06V 20/64* (2022.01)

(52) U.S. Cl.
CPC ............ *G06V 10/764* (2022.01); *G06V 10/82* (2022.01); *G06V 20/64* (2022.01)

(56) References Cited

U.S. PATENT DOCUMENTS

| | | | |
|---|---|---|---|
| 5,818,531 A | 10/1998 | Yamaguchi et al. | |
| 5,973,739 A | 10/1999 | Nilsson | |
| 6,043,846 A | 3/2000 | Shen et al. | |
| 8,705,861 B2 | 4/2014 | Eaton et al. | |
| 9,313,511 B2 | 4/2016 | Reibman et al. | |
| 2011/0075950 A1* | 3/2011 | Ohashi | G06V 10/50 382/305 |
| 2019/0095200 A1 | 3/2019 | Huang et al. | |
| 2022/0262093 A1* | 8/2022 | Zhou | G06V 10/255 |

FOREIGN PATENT DOCUMENTS

| | | |
|---|---|---|
| KR | 10-2018-0070258 A | 6/2018 |
| KR | 10-2019-0095200 A | 8/2019 |

OTHER PUBLICATIONS

Bertinetto, Luca, et al., "Fully-Convolutional Siamese Networks for Object Tracking", *European conference on computer vision. Springer, Cham*, Sep. 14, 2016 (pp. 1-16).

Valmadre, Jack, et al., "End-to-end representation learning for correlation filter based tracking", *Proceedings of the IEEE Conference on Computer Vision and Pattern Recognition*, 2017 (pp. 1-15).

Li, Bo, et al. "SiamRPN++: Evolution of Siamese Visual Tracking with Very Deep Networks", *Proceedings of the IEEE Conference on Computer Vision and Pattern Recognition*, 2019 (pp. 1-10).

* cited by examiner

METHOD AND APPARATUS FOR TRACKING TARGET

CROSS-REFERENCE TO RELATED APPLICATIONS

This application claims the benefit under 35 USC § 119(a) of Chinese Patent Application No. 202010044865.3 filed on Jan. 16, 2020, in the China National Intellectual Property Administration, and Korean Patent Application No. 10-2020-0179773 filed on Dec. 21, 2020, in the Korean Intellectual Property Office, the entire disclosures of which are incorporated herein by reference for all purposes.

BACKGROUND

Field

The following description relates to tracking a target in an image, and more particularly, tracking a target stepwise.

Description of Related Art

Visual object tracking is an important fields in computer vision. Visual object tracking is a method of continuously predicting a bounding box of a target in a subsequent frame image based on a first frame image and a provided bounding box in a single video sequence. The target may be an object or a part of an object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of tracking a target, the method including obtaining a first depth feature from a target region image and obtaining a second depth feature from a search region image, obtaining a global response diagram between the first depth feature and the second depth feature, acquiring temporary bounding box information based on the global response diagram, updating the second depth feature based on the temporary bounding box information, obtaining local feature blocks based on the first depth feature, obtaining a local response diagram based on the local feature blocks and the updated second depth feature, and determining output bounding box information based on the local response diagram.

The obtaining of the local feature blocks may include obtaining the local feature blocks by dividing the first depth feature or a third depth feature extracted from the first depth feature, and the obtaining of the local response diagram may include obtaining the local response diagram based on correlations between the second depth feature or a fourth depth feature extracted from the updated second depth feature and the local feature blocks.

The obtaining of the local response diagram based on the correlations may include obtaining local sub-response diagrams based on the correlations between the second depth feature or the fourth depth feature and the respective local feature blocks, and obtaining the local response diagram by synthesizing the local sub-response diagrams.

The obtaining of the local response diagram by synthesizing the local sub-response diagrams may include classifying the local feature blocks into target feature blocks and background feature blocks, and obtaining the local response diagram by synthesizing the local sub-response diagrams based on a result of the classification.

The classifying may include classifying the local feature blocks into the target feature blocks and the background feature blocks based on overlap ratios of the respective local feature blocks to a temporary bounding box.

The output bounding box information may include coordinate offsets between coordinates of the center of a temporary bounding box included in the temporary bounding box information and coordinates of the center of an output bounding box and a size offset between the size of the output bounding box and a preset size, and the determining of the output bounding box information may include outputting the temporary bounding box information as the output bounding box information, in response to a sum of absolute values of the coordinate offsets being greater than a threshold, and outputting a result of adding the coordinates of the center of the temporary bounding box and the coordinate offsets and a result of adding the size of the temporary bounding box and the size offset as the output bounding box information, in response to the sum of absolute values of the coordinate offsets being less than or equal to the threshold.

The acquiring of the temporary bounding box information may include outputting coordinates with the highest correlation in the global response diagram of a current frame as coordinates of the center of the temporary bounding box of the current frame, and outputting the size of an output bounding box estimated in a previous frame as the size of the temporary bounding box of the current frame.

The obtaining of the local feature blocks by dividing the first depth feature or the third depth feature may include dividing the first depth feature or the third depth feature based on any one of the local feature blocks not overlapping, the local feature blocks overlapping, and a preset block distribution.

In another general aspect, there is provided an apparatus for tracking a target, the apparatus including a processor configured to obtain a first depth feature from a target region image and obtain a second depth feature from a search region image, obtain a global response diagram between the first depth feature and the second depth feature, acquire temporary bounding box information based on the global response diagram, updated the second depth feature based on the temporary bounding box information, obtain local feature blocks based on the first depth feature, obtain a local response diagram based on the local feature blocks and the updated second depth feature, and determine output bounding box information based on the local response diagram.

The processor may be configured to obtain the local feature blocks by dividing the first depth feature or a third depth feature extracted from the first depth feature, and obtain the local response diagram based on correlations between the second depth feature or a fourth depth feature extracted from the updated second depth feature and the local feature blocks.

The processor may be configured to divide the first depth feature or the third depth feature based on any one of the local feature blocks not overlapping, the local feature blocks overlapping, and a preset block distribution.

The processor may be configured to obtain local sub-response diagrams based on the correlations between the second depth feature or the fourth depth feature and the respective local feature blocks, and obtain the local response diagram by synthesizing the local sub-response diagrams.

The processor may be configured to classify the local feature blocks into target feature blocks and background feature blocks, and obtain the local response diagram by synthesizing the local sub-response diagrams based on a result of the classification.

The processor may be configured to classify the local feature blocks into the target feature blocks and the background feature blocks based on overlap ratios of the respective local feature blocks to a temporary bounding box.

The output bounding box information may include coordinate offsets between coordinates of the center of a temporary bounding box included in the temporary bounding box information and coordinates of the center of an output bounding box and a size offset between the size of the output bounding box and a preset size, and the processor may be configured to output the temporary bounding box information as the output bounding box information, in response to a sum of absolute values of the coordinate offsets being greater than a threshold, and output a result of adding the coordinates of the center of the temporary bounding box and the coordinate offsets and a result of adding the size of the temporary bounding box and the size offset as the output bounding box information, in response to the sum of absolute values of the coordinate offsets being less than or equal to the threshold.

Other features and aspects will be apparent from the following detailed description, the drawings, and the claims.

Figure 1:
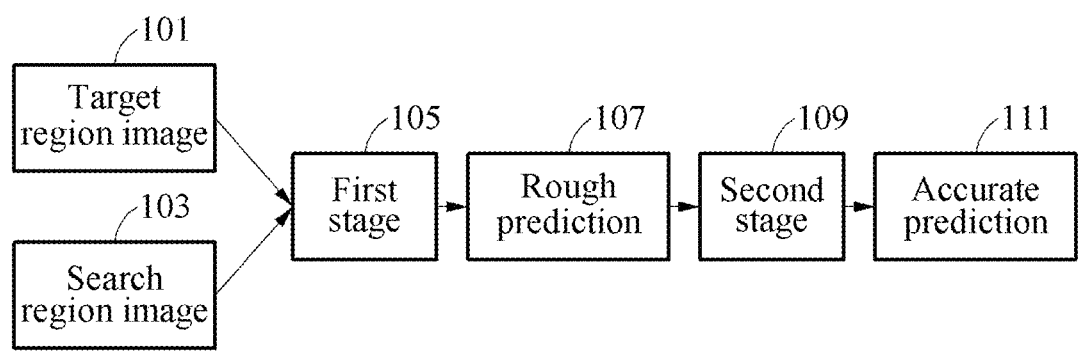
FIG. 1 illustrates an example of a target tracking method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an overall operation of a target tracking method.

A target tracking apparatus may track a target in successive images using two stages. The target tracking apparatus may determine a target region image 101 and a search region image 103. The target tracking apparatus may perform rough prediction 107 on a region matching the target region image 101 from the search region image 103 at a first stage 105. Temporary bounding box information may be obtained as a result of the rough prediction 107. The target tracking apparatus may perform accurate prediction 111 based on the temporary bounding box information at a second stage 109. Output bounding box information may be output as a result of the accurate prediction 111.

The target tracking apparatus may perform target tracking in two stages, and track a target using a block correlation and a global correlation. The target tracking apparatus may extract information for adjusting the temporary bounding box information by applying the block correlation. Through this, the target tracking apparatus may achieve high-accuracy target tracking by using fewer resources. Since the target tracking apparatus uses fewer resources, the target tracking apparatus may perform stable real-time tracking with high accuracy even in a mobile environment.

Hereinafter, an input image refers to an image that is input into the target tracking apparatus. The input image may include successive frames. However, examples are not limited thereto. A target refers to an object to be tracked in an input image. A target region image refers to a reference image representing a target, and may be referred to as a template image. A search region image refers to an image as a region where a search for a target is performed.

In the examples described below, a first depth feature refers to a feature extracted from a target region image. A second depth feature refers to a feature extracted from a search region image. A global correlation refers to a correlation operation between all first depth features and a second depth feature. A global response diagram refers to a result of a global correlation. A third depth feature refers to a depth feature extracted through an additional convolution operation on a first depth feature, and a fourth depth feature refers to a depth feature extracted through an additional convolution operation on a second depth feature.

A local feature block refers to a result of dividing a feature of a target region image. Here, the feature of the target region image may include a first depth feature or a third depth feature derived from the first depth feature. The local feature block is not necessarily a rectangular block and may include blocks in various shapes. A local correlation refers to a correlation operation between each local feature block and a second depth feature or an updated second depth feature. A local response diagram refers to a result of a local correlation.

Temporary bounding box information refers to information on a temporary bounding box as a result of a first stage, and output bounding box information refers to information on an output bounding box as a result of a second stage. Each piece of bounding box information may include position information and size information of a target in a search region.

Figure 2:
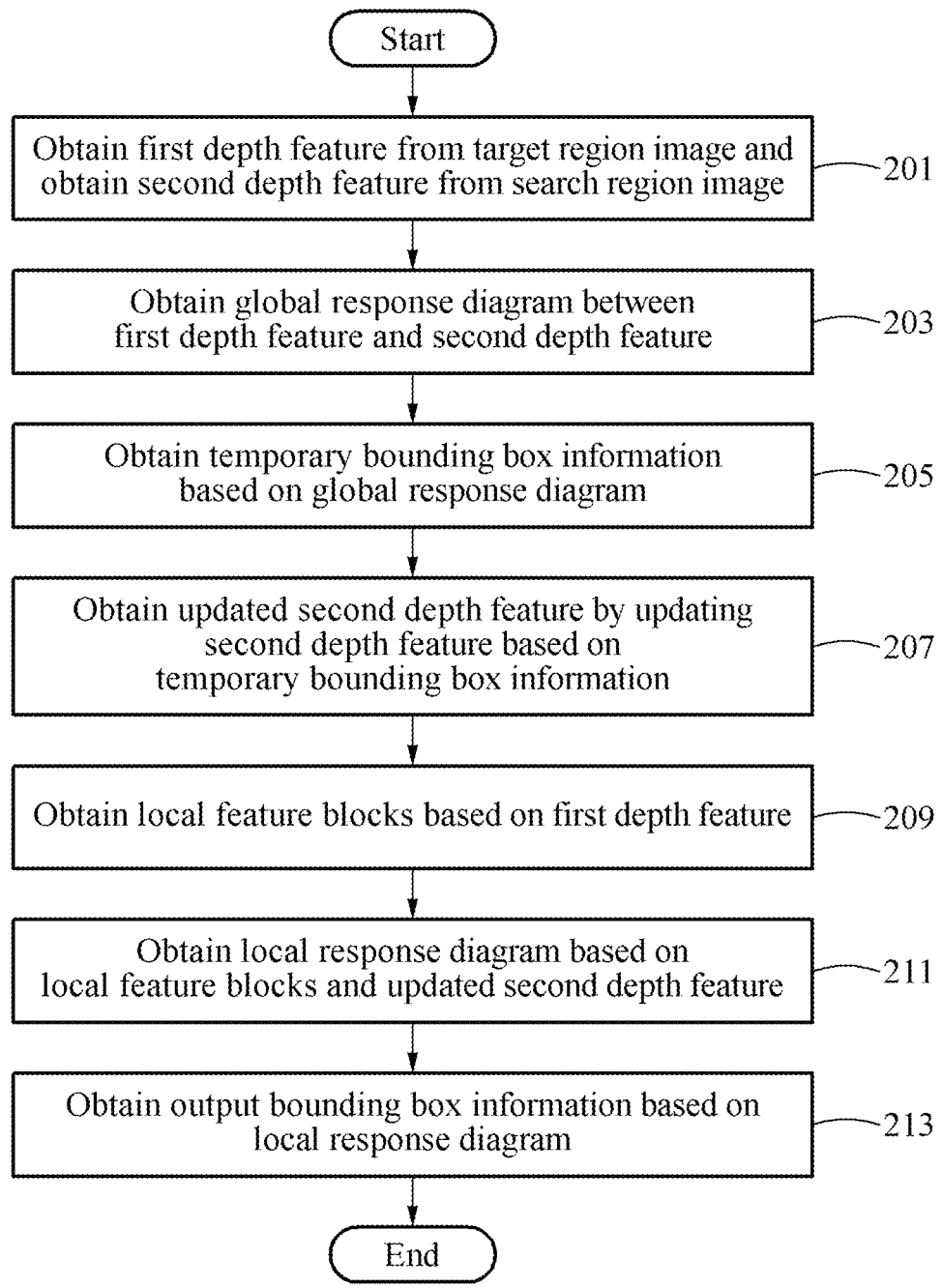
FIG. 2 illustrates another example of a target tracking method.

FIG. 2 illustrates an example of a target tracking method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In FIG. 2, operations 201 to 205 correspond to a first stage, and operations 207 to 213 correspond to a second stage. Here, the first stage and the second stage are distinguished only for ease of description, and such stage division may not be needed.

In operation 201, a target tracking apparatus may obtain a first depth feature from a target region image and obtain a second depth feature from a search region image.

For example, the target tracking apparatus may obtain successive frames. The target tracking apparatus may set a partial region in a first frame image, among the successive frames, as the target region image using a first neural network. For example, the first neural network may be a Siamese convolutional network. However, examples are not limited thereto. The target tracking apparatus may extract the first depth feature from the target region image. The target tracking apparatus may set a current frame as the search region image and extract the second depth feature from the search region image. In an example, the target region image may be obtained by clipping the first frame image according to a manually set initial bounding box or an output bounding box for a previous frame. However, examples are not limited thereto. Further, the first depth feature is a global feature of the target region image, and the second depth feature is a global feature of the search region image.

In operation 203, the target tracking apparatus may obtain a global response diagram between the first depth feature and the second depth feature. For example, the target tracking apparatus may obtain the global response diagram by calculating a global correlation between the first depth feature and the second depth feature.

A response diagram Y indicating a similarity between two images may be obtained by applying a correlation operation to the two images. The greater the value of the similarity, the higher is the similarity between a region in a search region image Z and a target region image X. For example, the correlation operation may be performed by Equation 1.

$$Y = \text{corr}(X, Z) \qquad \text{[Equation 1]}$$

$$Y(i, j) = \sum_{u=-h/2}^{h/2} \sum_{v=-w/2}^{w/2} X[u, v]Z[i+u, j+v]$$

In Equation 1, h and w denote the size of the image X, and i, j, u, and v denote the coordinates of the respective images.

In operation 205, the target tracking apparatus may obtain temporary bounding box information based on the global response diagram. The target tracking apparatus may output coordinates with the highest correlation in the global response diagram of the current frame as coordinates of the center of a temporary bounding box of the current frame, and output the size of an output bounding box estimated in a previous frame as the size of the temporary bounding box of the current frame.

In operation 207, the target tracking apparatus may obtain an updated second depth feature by updating the second depth feature based on the temporary bounding box information. For example, the target tracking apparatus may obtain a search region image of a reduced region by clipping the search region image according to the temporary bounding box. The target tracking apparatus may update the second depth feature by extracting a depth feature from the search region image of the reduced region.

In operation 209, the target tracking apparatus may obtain local feature blocks based on the first depth feature. The target tracking apparatus may obtain the local feature blocks by dividing the first depth feature or a third depth feature additionally extracted from the first depth feature. The target tracking apparatus may additionally extract the third depth feature by inputting the first depth feature into a second neural network.

The target tracking apparatus may divide the first depth feature or the third depth feature into local feature blocks. The target tracking apparatus may divide the first depth feature or the third depth feature in various ways such as, for example, such that the local feature blocks do not overlap, such that the local feature blocks overlap, or based on a preset block distribution.

Here, the preset block distribution may be an artificially determined distribution or a distribution derived by a trained neural network. The artificially determined distribution may include a Gaussian distribution. A neural network configured to output a distribution may be trained to find optimized parameters for a distribution such as a Gaussian distribution (for example, the mean and variance of a Gaussian distribution).

In operation 211, the target tracking apparatus may obtain a local response diagram based on the local feature blocks and the updated second depth feature. The target tracking apparatus may obtain the local response diagram based on correlations between the second depth feature or a fourth depth feature additionally extracted from the updated second depth feature and the local feature blocks. The target tracking apparatus may additionally extract the fourth depth feature by inputting the second depth feature into the second neural network.

The target tracking apparatus may obtain local sub-response diagrams based on the correlations between the second depth feature or the fourth depth feature and the respective local feature blocks.

The target tracking apparatus may obtain the local response diagram by synthesizing the local sub-response diagrams. The target tracking apparatus may classify the local feature blocks into target feature blocks and background feature blocks. The target tracking apparatus may classify the local feature blocks into target feature blocks and background feature blocks based on overlap ratios of the respective local feature blocks to the temporary bounding box. The target tracking apparatus may obtain the local response diagram by synthesizing the local sub-response diagrams based on the result of the classification.

In operation 213, the target tracking apparatus may obtain output bounding box information based on the local response diagram. The output bounding box information may include coordinate offsets between coordinates of the center of a temporary bounding box included in the temporary bounding box information and coordinates of the center of an output bounding box and a size offset between the size of the output bounding box and a preset size. The target tracking apparatus may output the temporary bounding box information as the output bounding box information, in response to the sum of absolute values of the coordinate offsets being greater than a threshold. The target tracking apparatus may output a result of adding the coordinates of the center of the temporary bounding box and the coordinate offsets and a result of adding the size of the temporary bounding box and the size offset as the output bounding box information, in response to the sum of absolute values of the coordinate offsets being less than or equal to the threshold.

Figure 3:
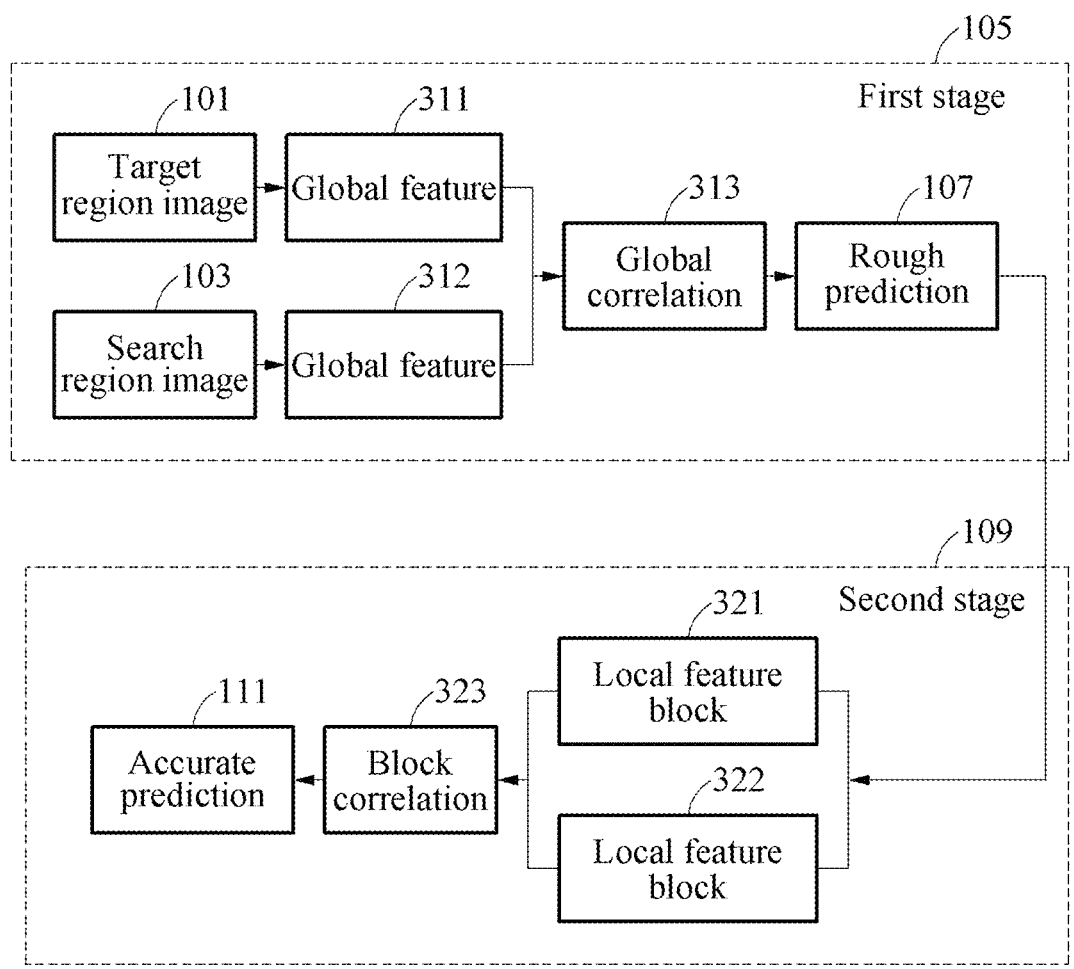
FIG. 3 illustrates an example of a detailed operation of a target tracking method.

FIG. 3 illustrates an example of a detailed operation of a target tracking method.

As shown in FIG. 3, a target tracking method includes two stages. At a first stage, rough prediction 107 is performed. At the first stage 105, the target region image 101 and the search region image 103 may be determined. The target tracking apparatus may extract a global feature 311 of the target region image 101 and a global feature 312 of the search region image 103, and obtain a global response diagram by calculating a global correlation 313 for the extracted global features 311 and 312. The target tracking apparatus may obtain temporary bounding box information based on the global response diagram.

At a second stage, accurate prediction 111 is performed. The target tracking apparatus may obtain local feature blocks 321 and 322 by dividing the feature of the target region image, and obtain the local response diagram by calculating a block correlation 323 between the feature of the updated search region image and the local feature blocks 321 and 322. The target tracking apparatus may output the bounding box information based on the local response diagram.

Figure 4:
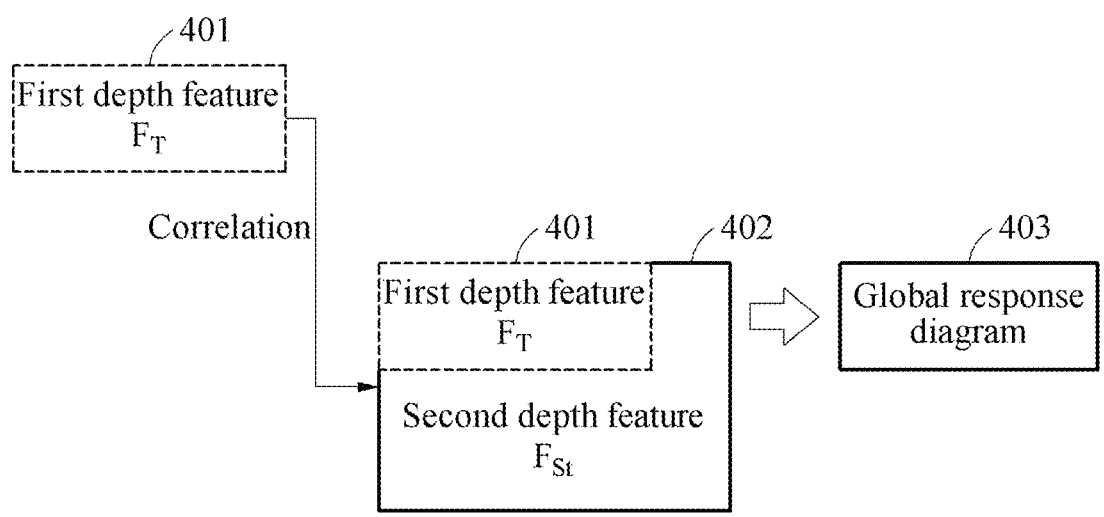
FIG. 4 illustrates an example of a global correlation operation.

FIG. 4 illustrates an example of a global correlation operation.

Referring to FIG. 4, a target tracking apparatus may perform a correlation operation between a first depth feature $F_T$ 401 and a second depth feature $F_{St}$ 402. The target tracking apparatus may calculate a correlation at each position while sliding the first depth feature $F_T$ 401 relative to the second depth feature $F_{St}$ 402. The target tracking apparatus may obtain a global response diagram 403 through a global correlation.

Figure 5:
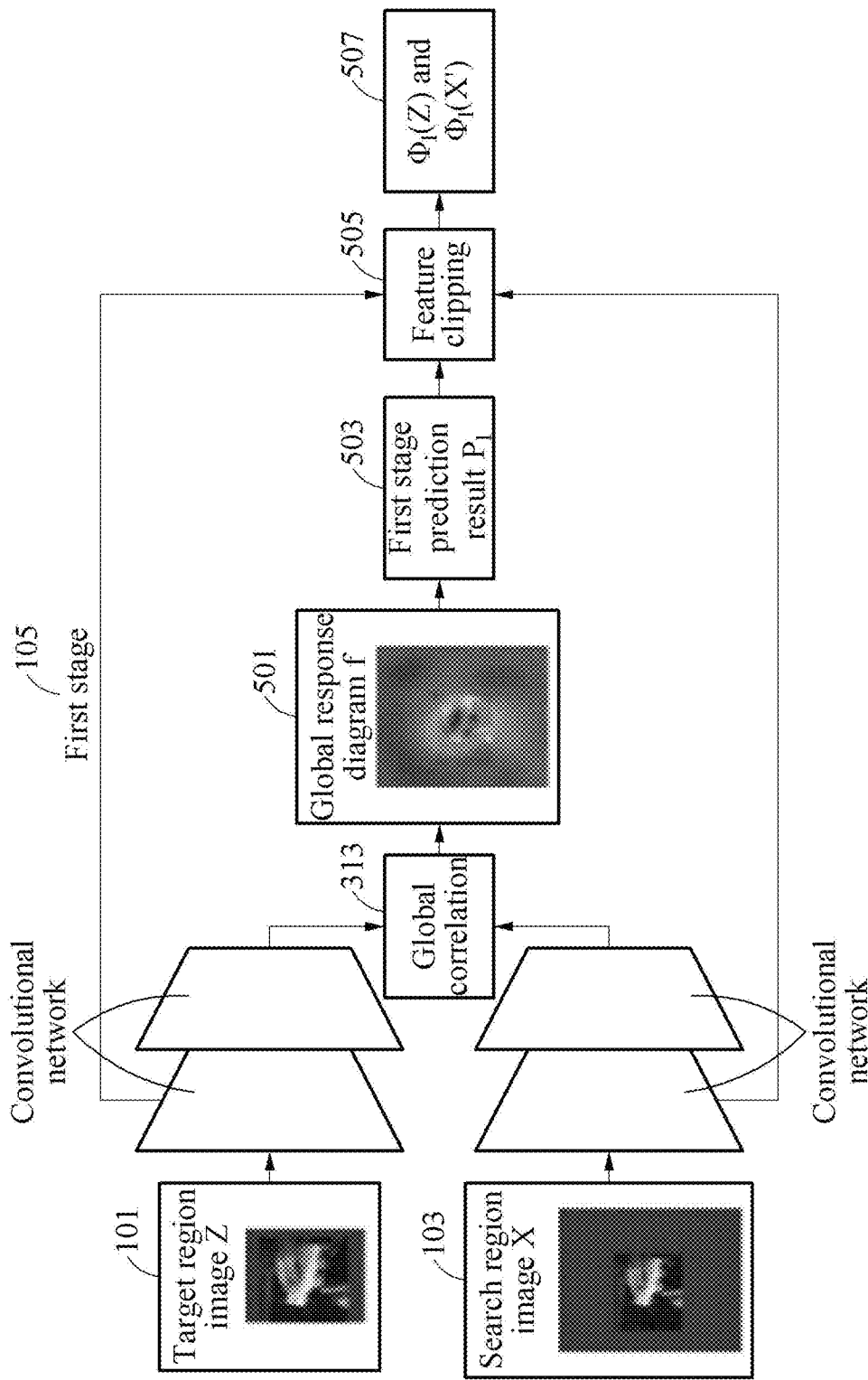
FIG. 5 illustrates an example of a first stage in a target tracking method.

FIG. 5 illustrates an example of a first stage in a target tracking method.

At the first stage 105, a target tracking apparatus may output a temporary bounding box. To this end, the target tracking apparatus may perform feature extraction, global correlation 313, and feature clipping 505.

The target tracking apparatus may extract features respectively for the target region image 101 and the search region image 103 using a first neural network. The first neural network may include a convolutional neural network $\phi_1$. The target tracking apparatus may output the first depth feature $\phi_1(Z)$ by inputting the target region image Z 101 into the convolutional neural network $\phi_1$. The target tracking apparatus may output the second depth feature $\phi_1(X)$ by inputting the search region image X 103 into the convolutional neural network $\phi_1$. For example, the convolutional neural network $\phi_1$ may be a Siamese convolutional network. Parameters of the two branches in FIG. 5 may be shared such that the input image may be mapped to the same feature space.

The target tracking apparatus may output a global response diagram f 501 by performing the global correlation 313 for the extracted first depth feature $\phi_1(Z)$ and the second depth feature $\phi_1(X)$. The target tracking apparatus may output temporary bounding box information $P_1$ 503, which is the first stage prediction result, based on the global response diagram f 501. The target tracking apparatus may obtain the global response diagram between the first depth feature $\phi_1(Z)$ and the second depth feature $\phi_1(X)$ using Equation 2.

$$f = \text{corr}(\phi_1(Z), \phi_1(X)) \qquad \text{[Equation 2]}$$

The target tracking apparatus may output a position with the greatest value in the global response diagram as position information of the temporary bounding box. The target tracking apparatus may output the size of an output bounding box of a previous frame as size information of the temporary bounding box.

The target tracking apparatus may perform feature clipping 505 for the first stage prediction result $P_1$ 503. The target tracking apparatus may update the second depth feature by extracting a depth feature from the search region image clipped by feature clipping 505. As a result, the target tracking apparatus may output the second depth feature $\phi_1(X')$ updated in the first stage 105 and the first depth feature $\phi_1(Z)$. The temporary bounding box information $P_1$ 503 may be expressed as $P_1=(x_1, y_1, w_1, h_1)$. Here, $x_1$ and $y_1$ denote the horizontal and vertical coordinates of the center of a temporary bounding box of the first stage, respectively. $w_1$ and $h_1$ denote the width and the height of the temporary bounding box, respectively.

The target tracking apparatus may obtain a smaller search region image X' by clipping the search region image X according to the coordinates of the center and the size of the temporary bounding box. The target tracking apparatus may obtain the updated second depth feature $\phi_1(X)$ by extracting a depth feature of the search region image X'.

Figure 6:
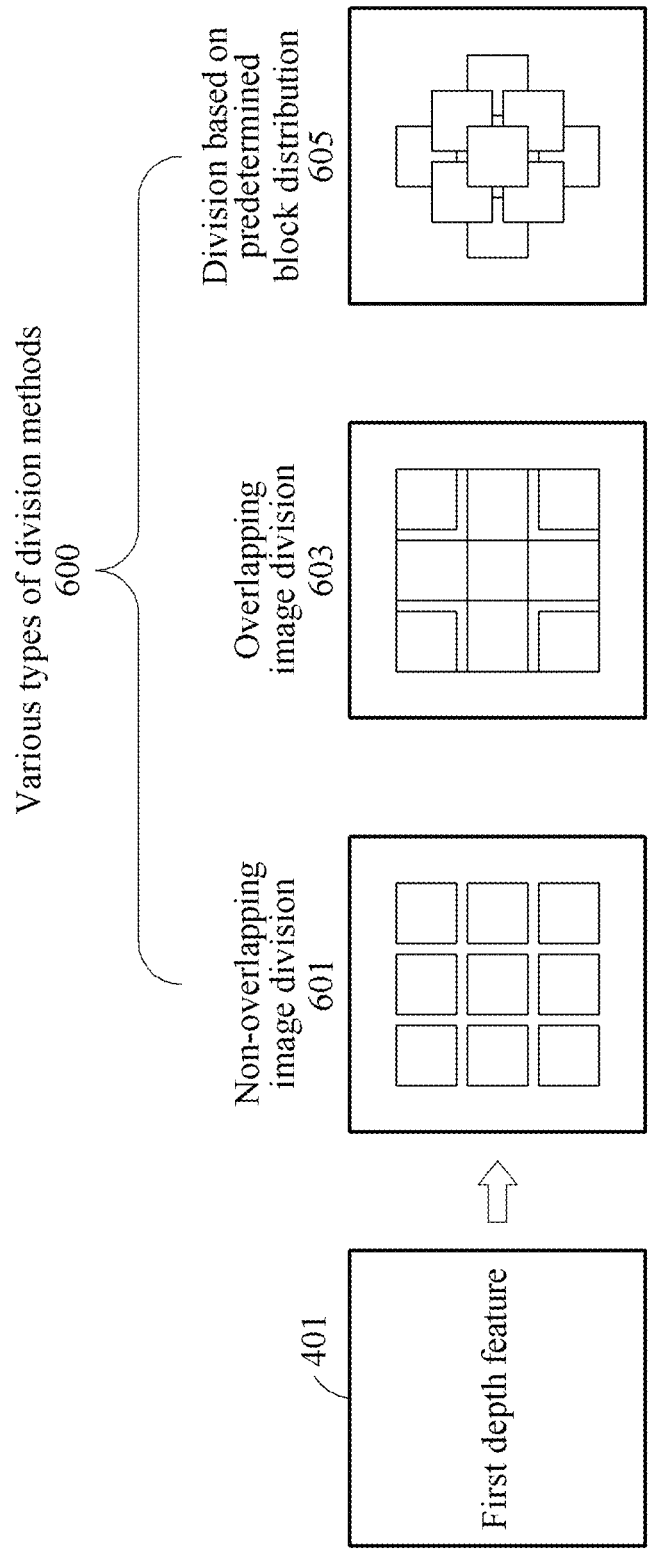
FIG. 6 illustrates an example of a block dividing method.

FIG. 6 illustrates an example of a block dividing method.

Referring to FIG. 6, various types of division methods 600 performed by a target tracking apparatus are disclosed. The target tracking apparatus may divide the first depth feature 401 or a third depth feature (not shown) into local feature blocks. According to a non-overlapping image division method 601, the target tracking apparatus may divide the first depth feature 401 or the third depth feature such that the local feature blocks do not overlap. According to an overlapping image division method 603, the target tracking apparatus may divide the first depth feature 401 or the third depth feature such that the local feature blocks overlap. According to a division method 605 based on a predetermined block distribution, the target tracking apparatus may divide the first depth feature 401 or the third depth feature based on a preset block distribution.

Figure 7:
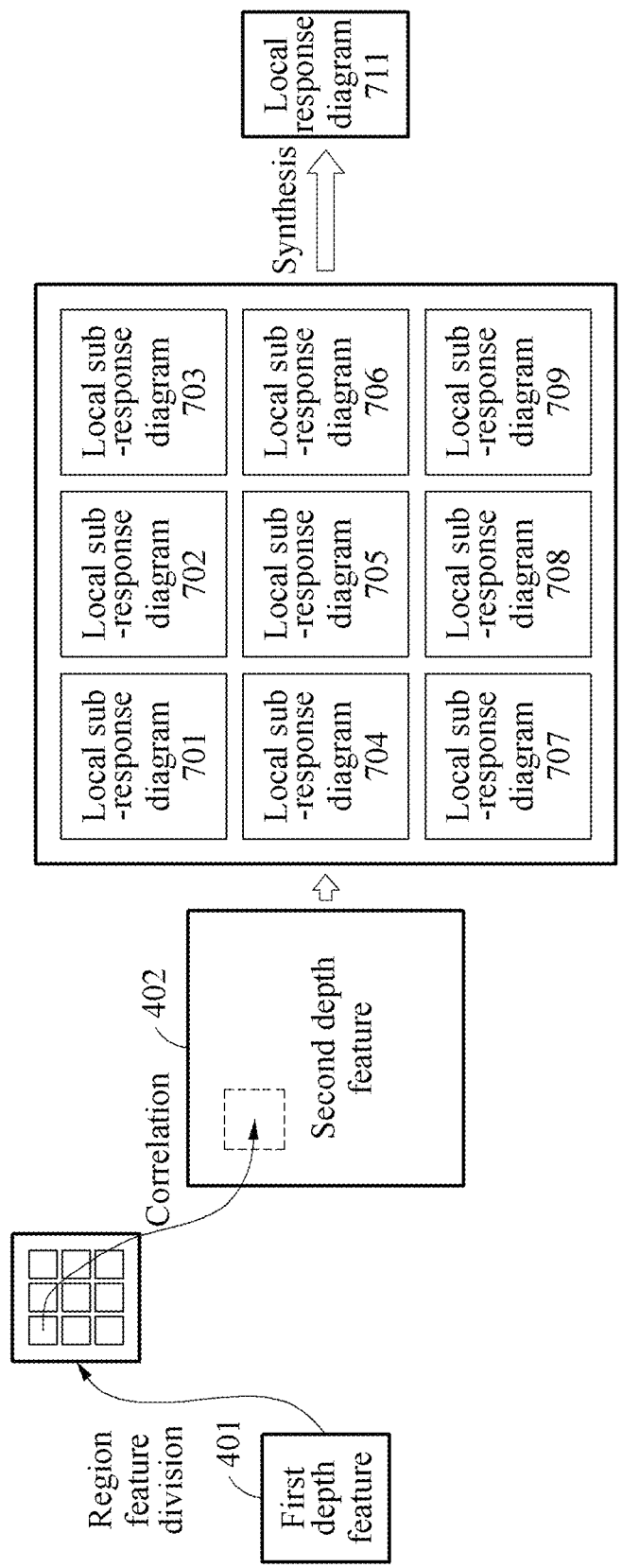
FIG. 7 illustrates an example of a block correlation operation.

FIG. 7 illustrates an example of a block correlation operation.

The example of FIG. 7 is provided assuming the first depth feature 401 for ease of description. However, a block correlation operation may also be performed for a third depth feature. Referring to FIG. 7, region feature division may be performed on the first depth feature 401. The first depth feature 401 may be divided into local feature blocks.

A target tracking apparatus may calculate correlations between the second depth feature 402 and the local features. The target tracking apparatus may output local sub-response diagrams 701, 702, 703, 704, 705, 706, 707, 708, and 709 as the calculation results. The target tracking apparatus may obtain a local response diagram 711 by synthesizing the local sub-response diagrams 701, 702, 703, 704, 705, 706, 707, 708, and 709.

For example, the target tracking apparatus may classify each of the local feature blocks as a target feature block or a background feature block. The target tracking apparatus may obtain local sub-response diagrams corresponding to target feature blocks and obtain local sub-response diagrams corresponding to background feature blocks. The target tracking apparatus may output the local response diagram 711 by synthesizing all the local sub-response diagrams.

A target region image includes a target region and a background region, and the features of the background region may affect the stability and accuracy of target tracking. The target tracking apparatus may increase the stability and accuracy of target tracking through the method shown in FIG. 7. The target tracking apparatus may perform synthesis after classifying the local feature blocks into target feature blocks and background feature blocks, thereby effectively reducing interference by the background.

Figure 8:
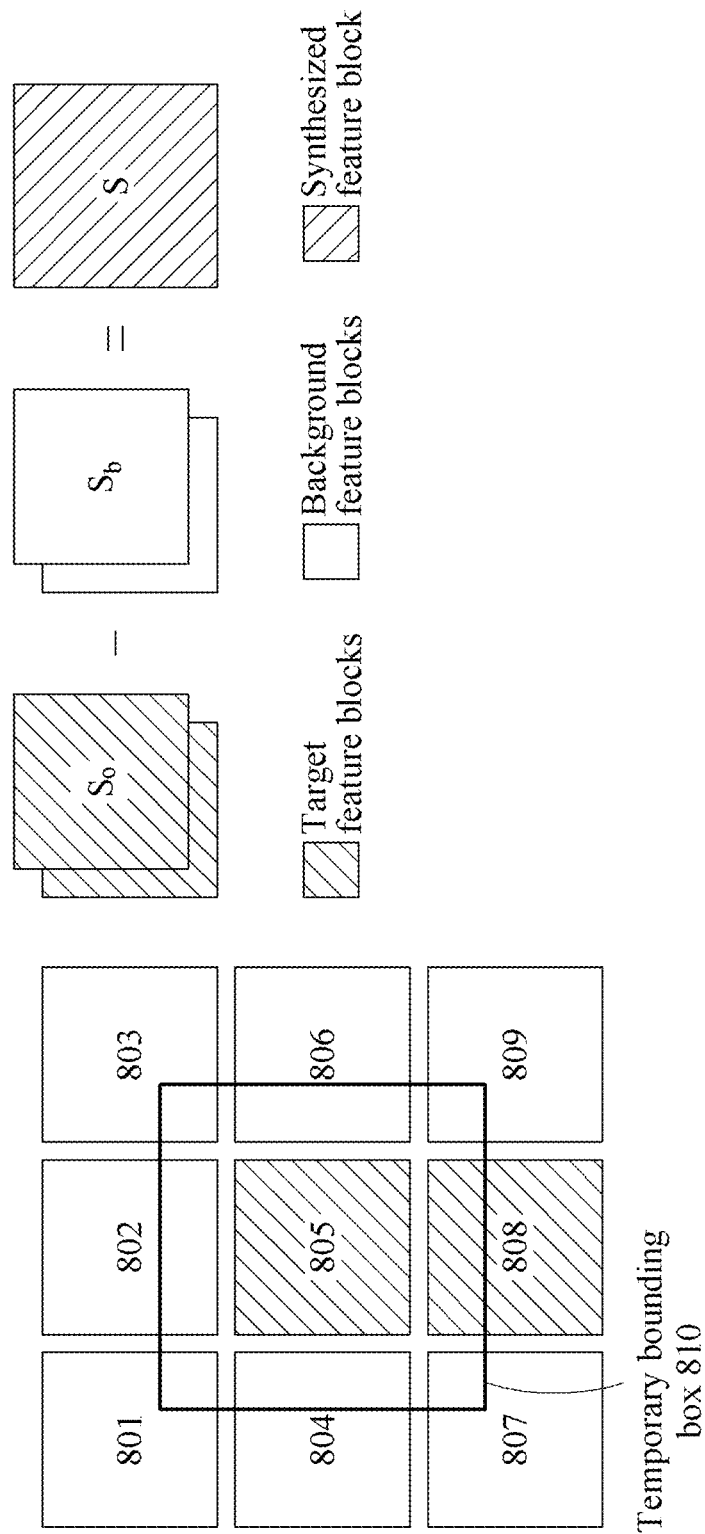
FIG. 8 illustrates an example of suppressing interference and fusing response diagrams.

FIG. 8 illustrates an example of suppressing interference and fusing response diagrams.

The target tracking apparatus may obtain a local response diagram by synthesizing local sub-response diagrams. The target tracking apparatus may classify the local feature blocks into target feature blocks and background feature blocks. Local feature blocks 801, 802, 803, 804, 805, 806, 807, 808, and 809 may be classified into target feature blocks and background feature blocks based on overlap ratios of the respective local feature blocks 801, 802, 803, 804, 805, 806, 807, 808, and 809 to a temporary bounding box 810.

The target tracking apparatus may classify each of the local feature blocks 801, 802, 803, 804, 805, 806, 807, 808, and 809 as a target feature block or a background feature block, based on the proportion of each of the local feature blocks 801, 802, 803, 804, 805, 806, 807, 808, and 809 in the overlap region between each of the local feature blocks 801, 802, 803, 804, 805, 806, 807, 808, and 809 and the temporary bounding box 810. For example, based on the temporary bounding box 810 corrected in the target region image, a local feature block occupying a region more than p % in the temporary bounding box may be classified as a target feature block, and a local feature block overlapping the temporary bounding box 810 less than p % may be classified as a background feature block. Here, p may be a threshold that is determined.

The target tracking apparatus may obtain a local response diagram by synthesizing local sub-response diagrams corresponding to the target feature blocks and local sub-response diagrams corresponding to the background feature blocks using Equation 3.

$$S = \frac{s_o}{\lambda} - \frac{s_b}{(1-\lambda)}, \; \lambda = \frac{n_o}{n_o + n_b} \quad \text{[Equation 3]}$$

In Equation 3, S denotes the local response diagram, $S_o$ denotes the local sub-response diagrams corresponding to the target feature blocks, $S_b$ denotes the local sub-response diagrams corresponding to the background feature blocks, $n_o$ denotes the number of target feature blocks, and $n_b$ denotes the number of background feature blocks.

The target tracking apparatus may output an output bounding box based on the local response diagram. The target tracking apparatus may predict position offsets and a size offset of the temporary bounding box 810 based on the local response diagram. The target tracking apparatus may output an output bounding box based on the predicted position offsets and size offset.

For example, the target tracking apparatus may process the local response diagram using a third neural network and predict position offsets and a size offset of the output bounding box. The third neural network may be different from the first neural network and the second neural network described above. Here, a result of predicting the output bounding box may include position information and size information of a target bounding box. Hereinafter, the process of outputting an output bounding box based on a local response diagram may be referred to as self-adaptive prediction.

Figure 9:
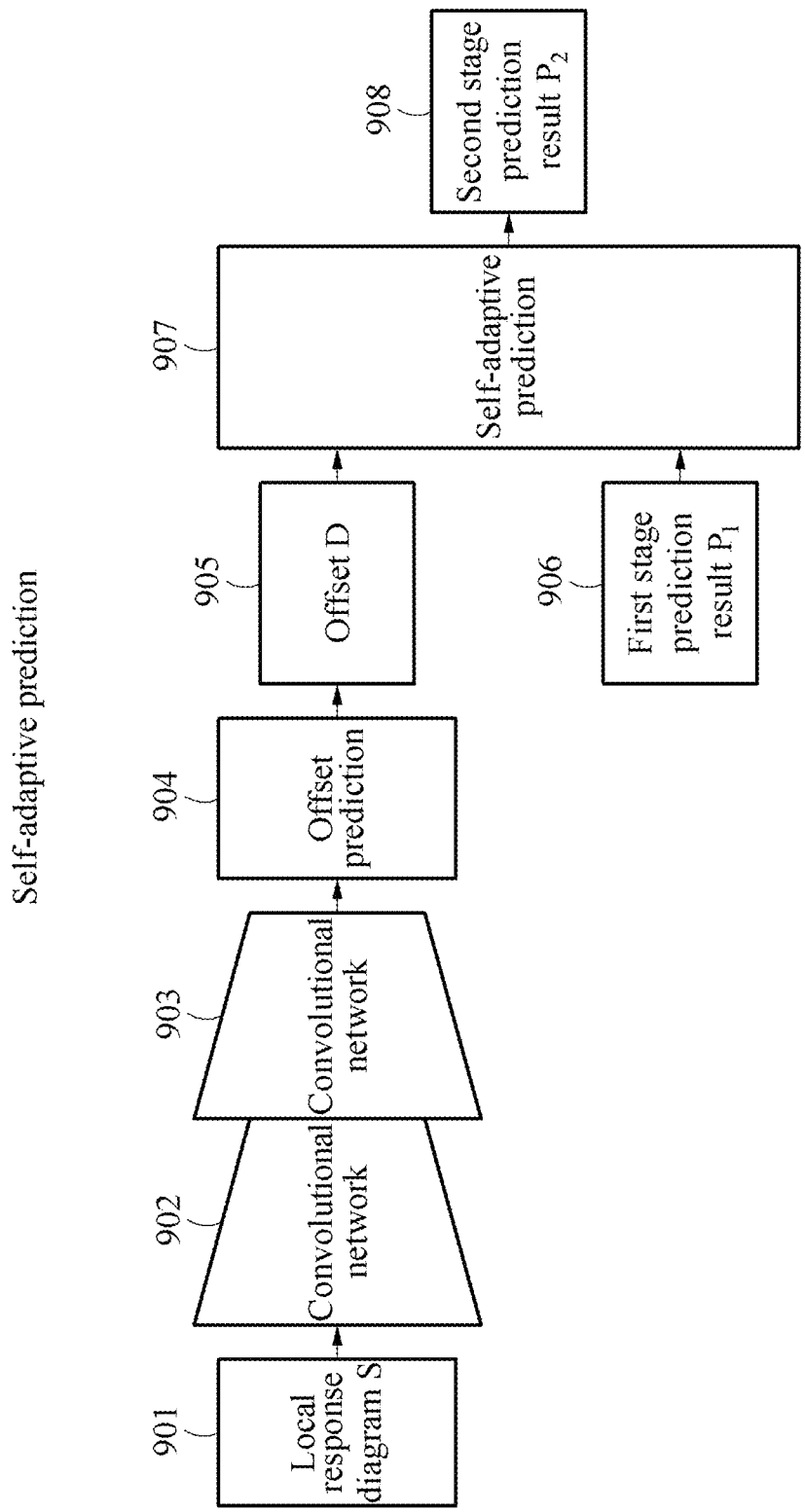
FIG. 9 illustrates an example of self-adaptive prediction.

FIG. 9 illustrates an example of self-adaptive prediction.

A target tracking apparatus may process a local response diagram S 901 using convolutional neural networks 902 and 903. The target tracking apparatus may output an offset D 905 through offset prediction 904. The target tracking apparatus may perform self-adaptive prediction 907 based on a first stage prediction result $P_1$ 906 and the offset D 905. A second stage prediction result $P_2$ 908 may be output as the result of self-adaptive prediction 907.

The target tracking apparatus may predict the offset $D=(d_x, d_y, d_w, d_h)$, and the offset includes position offsets and a size offset. For example, the position offsets may be coordinate offsets between coordinates of the center of an output bounding box of a second stage and coordinates of the center of a temporary bounding box of a first stage, and the size offset may be a size offset between the output bounding box of the second stage and a predetermined bounding box.

The target tracking apparatus may obtain a prediction result of the output bounding box of the second stage based on the predicted position offsets and size offset. In response to the sum of absolute values of the coordinate offsets being greater than a threshold, the target tracking apparatus may output a prediction result of the temporary bounding box of the first stage as the prediction result of the output bounding box of the second stage.

In response to the sum of the absolute values of the coordinate offsets being less than or equal to the threshold, the target tracking apparatus may obtain the prediction result of the output bounding box of the second stage by adding the coordinates of the center of the temporary bounding box of the first stage and the predicted position offsets and by adding the size of the predetermined bounding box and the predicted size offset.

For example, if the prediction result of the temporary bounding box of the first stage is $P_1=(x_1, y_1, w_1, h_1)$, and the size of the predesignated bounding box is $(w_0, h_0)$ (wherein $w_0$ denotes the width, and $h_0$ denotes the height), the prediction result of the output bounding box of the second stage may be $P_2=(x_1+d_x, y_1+d_y, w_0+d_w, h_0+d_h)$.

Figure 10:
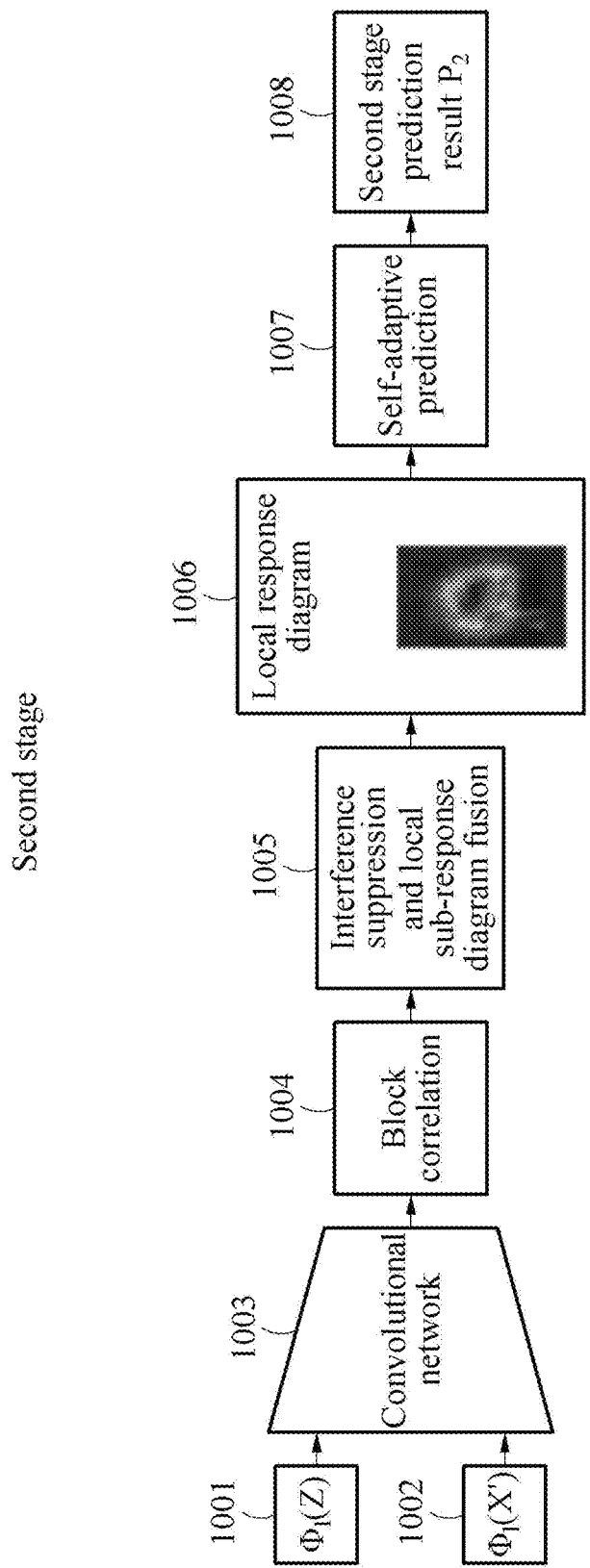
FIG. 10 illustrates examples of tasks at a second stage in a target tracking method.

FIG. 10 illustrates examples of tasks at a second stage in a target tracking method.

A target tracking apparatus may obtain a first depth feature $\phi_1(Z)$ and an updated second depth feature $\phi_1(X')$ through a first stage. The target tracking apparatus may input the first depth feature $\phi_1(Z)$ 1001 and the updated second depth feature $\phi_1(X')$ 1002 into a convolutional network 1003. The target tracking apparatus may perform a block correlation 1004. The target tracking apparatus may perform interference suppression and fuse local sub-response diagrams 1005. The target tracking apparatus may obtain a local response diagram 1006. The target tracking apparatus may perform self-adaptive prediction 1007. The target tracking apparatus may output a second stage prediction result $P_2$ 1008.

Figure 11:
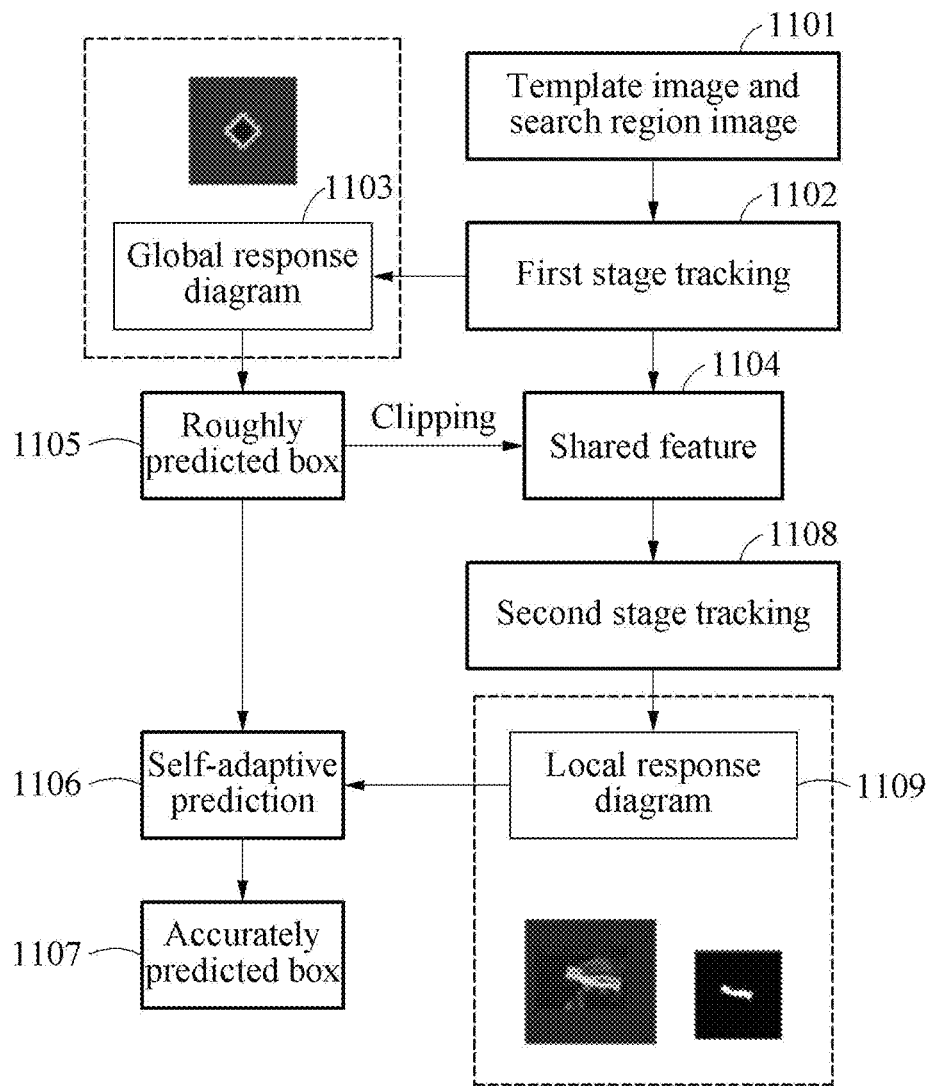
FIG. 11 illustrates an example of network training.

FIG. 11 illustrates an example of network training.

A target tracking apparatus may track a target using cascade networks (including a first neural network, a second neural network, and a third neural network). The cascade networks may be trained using multiple supervisory signals. Here, the multiple supervisory signals include a global response diagram, a local response diagram, and a target bounding box.

A portion of operations that are performed in the following training process may be similarly applied to the inference process. The multiple supervisory signals may be used to optimize a loss value of a loss function. The multiple supervisory signals may be used to learn parameters of the networks through iterative cyclic learning.

In the training process using multiple supervisory signals, a training device may obtain a global response diagram 1103 by performing first stage tracking 1102 for a template image and a search region image 1101. In the global response diagram, a case where the distance from the center is less than a threshold may be set as +1, and a case where the distance from the center is greater than the threshold may be set as −1. The training device may output a roughly predicted box 1105 based on the global response diagram 1103. The training device may output a shared feature 1104 based on the result of first stage tracking 1102 and the roughly predicted box 1105 that is clipped.

The training device may perform second stage tracking 1108. The training device may obtain a division result for a target in a search region image (using a division algorithm or manually). The training device may perform distance transformation on the division result, and obtain supervisory signals of a local response diagram 1109 by numerically normalizing a distance transformation map.

The training device may obtain an accurate prediction result 1107 through self-adaptive prediction 1106. In the training process, the global response diagram, the local response diagram 1109, and the target bounding box may be used as the supervisory signals, and the parameters of the cascade networks may be learned by optimizing the loss function through iterative cyclic learning.

For example, the training device may obtain temporary bounding box information by inputting an image pair (including a template image and a search region image) extracted from the same video sequence into the neural network of the first stage. The training device may calculate a loss $Loss_0$ between a predicted value and an actual value of the global response diagram using binary cross-entropy.

The training device may obtain the local response diagram 1109 by inputting the shared feature 1104 of the first stage into the neural network of the second stage based on the rough prediction result. The training device may obtain an accurate prediction result of the second stage based on the local response diagram. The training device may measure a loss $Loss_1$ between a predicted value and an actual value of the local response diagram using Kullback-Leibler (KL) divergence. The training device may measure a loss $Loss_2$ between an accurately predicted bounding box and an actual box using the L1 distance. The training device may train the parameters of the neural networks by optimizing the loss $(Loss=Loss_0+(a_1)*Loss_1+(a_2)*Loss_2)$. Here, $a_1$ and $a_2$ denote weights of the respective losses.

Figure 12:
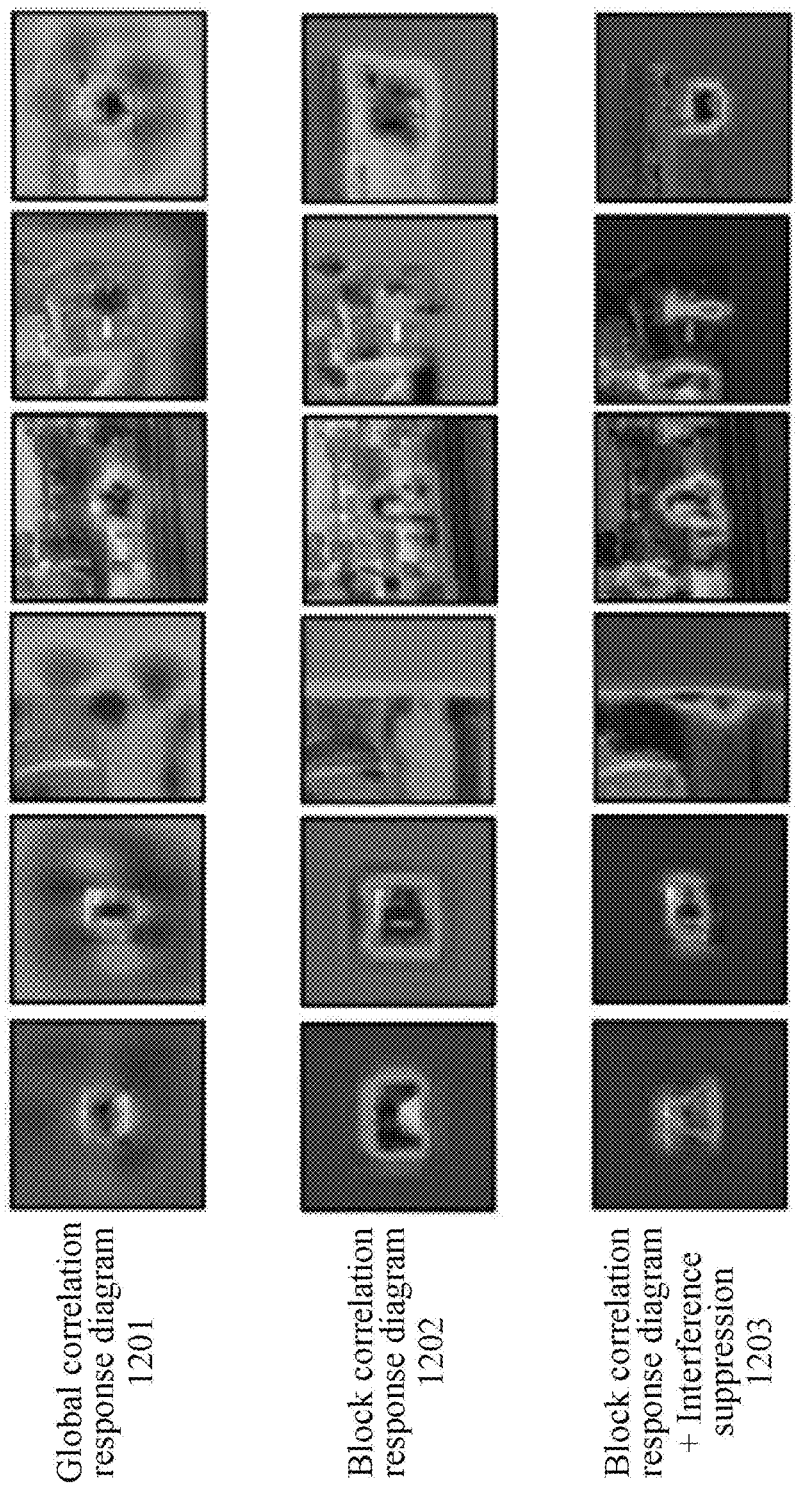
FIG. 12 illustrates an example of comparison in effects among a global correlation method, a block correlation method, and a block correlation method combined with interference suppression.

FIG. 12 illustrates an example of comparison in effects among a global correlation method, a block correlation method, and a block correlation method combined with interference suppression.

Referring to FIG. 12, a global correlation response diagram 1201, a block correlation response diagram 1202, and a result 1203 of performing interference suppression on a block correlation response diagram are shown. A target tracking apparatus may effectively extract detailed information of a target by performing interference suppression based on a block correlation, thereby further improving the accuracy of tracking.

Figure 13:
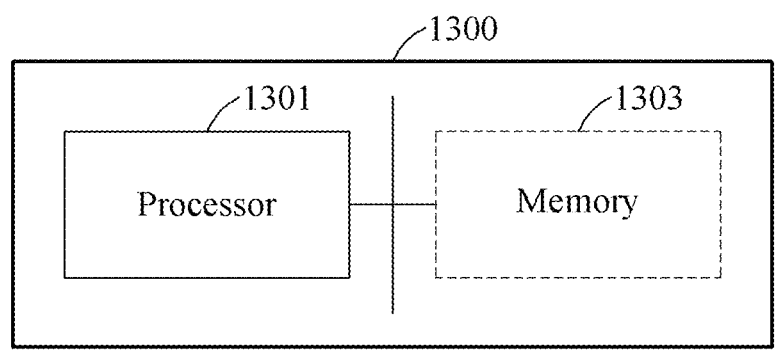
FIG. 13 illustrates an example of a target tracking apparatus.

FIG. 13 illustrates an example of a target tracking apparatus.

Referring to FIG. 13, a target tracking apparatus 1300 includes a processor 1301 and a memory 1303.

The processor 1301 may obtain a first depth feature from a target region image and obtain a second depth feature from a search region image. The processor 1301 may obtain a global response diagram between the first depth feature and the second depth feature. The processor 1301 may obtain temporary bounding box information based on the global response diagram. The processor 1301 may obtain an updated second depth feature by updating the second depth feature based on the temporary bounding box information. The processor 1301 may obtain local feature blocks based on the first depth feature. The processor 1301 may obtain a local response diagram based on the local feature blocks and the updated second depth feature. The processor 1301 may obtain output bounding box information based on the local response diagram. The processor 1301 executes a computer-readable code (for example, software) stored in a memory (for example, the memory 1303) and instructions triggered by the processor 1301. Further details regarding the processor 1301 is provided below.

The memory 1303 stores the data processed by the processor 1301. For example, the memory 1630 may store the program (or an application, or software). The stored program may be a set of syntaxes that are coded and executable by the processor 1620 to update an algorithm. The memory 1303 may include one or more volatile memories, non-volatile memories and RAM, flash memories, hard disk drives, and optical disk drives. Further details regarding the memory 1303 is provided below.

The target tracking apparatus may be incorporate in or implemented as various devices, such as, for example, display of an advanced driver-assistance systems (ADAS), eye glass display (EGD) that are operatively connected to the target tracking apparatus 1300, a personal computer (PC), a tablet device, a personal information terminal, a smart phone, a web application, a game controller, or other devices configured to execute program instructions. However, examples are not limited thereto.

The apparatuses, devices, units, modules, and components described herein with are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of tracking a target. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of tracking a target, the method comprising:
    obtaining a first depth feature from a target region image and obtaining a second depth feature from a search region image;
    obtaining a global response diagram between the first depth feature and the second depth feature;
    acquiring temporary bounding box information based on the global response diagram;
    updating the second depth feature based on the temporary bounding box information;
    obtaining local feature blocks based on the first depth feature;
    obtaining a local response diagram based on the local feature blocks and the updated second depth feature; and
    determining output bounding box information based on the local response diagram.

2. The method of claim 1, wherein the obtaining of the local feature blocks comprises obtaining the local feature blocks by dividing the first depth feature or a third depth feature extracted from the first depth feature, and
    the obtaining of the local response diagram comprises obtaining the local response diagram based on correlations between the second depth feature or a fourth depth feature extracted from the updated second depth feature and the local feature blocks.

3. The method of claim 2, wherein the obtaining of the local response diagram based on the correlations comprises:
    obtaining local sub-response diagrams based on the correlations between the second depth feature or the fourth depth feature and the respective local feature blocks; and
    obtaining the local response diagram by synthesizing the local sub-response diagrams.

4. The method of claim 3, wherein the obtaining of the local response diagram by synthesizing the local sub-response diagrams comprises:
    classifying the local feature blocks into target feature blocks and background feature blocks; and
    obtaining the local response diagram by synthesizing the local sub-response diagrams based on a result of the classification.

5. The method of claim 4, wherein the classifying comprises classifying the local feature blocks into the target feature blocks and the background feature blocks based on overlap ratios of the respective local feature blocks to a temporary bounding box.

6. The method of claim 3, wherein the output bounding box information comprises coordinate offsets between coordinates of the center of a temporary bounding box included in the temporary bounding box information and coordinates of the center of an output bounding box and a size offset between the size of the output bounding box and a preset size, and
    the determining of the output bounding box information comprises:
    outputting the temporary bounding box information as the output bounding box information, in response to a sum of absolute values of the coordinate offsets being greater than a threshold; and
    outputting a result of adding the coordinates of the center of the temporary bounding box and the coordinate offsets and a result of adding the size of the temporary bounding box and the size offset as the output bounding box information, in response to the sum of absolute values of the coordinate offsets being less than or equal to the threshold.

7. The method of claim 6, wherein the acquiring of the temporary bounding box information comprises outputting coordinates with the highest correlation in the global response diagram of a current frame as coordinates of the center of the temporary bounding box of the current frame, and outputting the size of an output bounding box estimated in a previous frame as the size of the temporary bounding box of the current frame.

8. The method of claim 2, wherein the obtaining of the local feature blocks by dividing the first depth feature or the third depth feature comprises dividing the first depth feature or the third depth feature based on any one of the local feature blocks not overlapping, the local feature blocks overlapping, and a preset block distribution.

9. A non-transitory computer-readable storage medium storing instructions that, when executed by a processor, cause the processor to perform the method of claim 1.

10. An apparatus for tracking a target, the apparatus comprising:
a processor configured to:
obtain a first depth feature from a target region image and obtain a second depth feature from a search region image,
obtain a global response diagram between the first depth feature and the second depth feature,
acquire temporary bounding box information based on the global response diagram,
update the second depth feature based on the temporary bounding box information,
obtain local feature blocks based on the first depth feature,
obtain a local response diagram based on the local feature blocks and the updated second depth feature, and
determine output bounding box information based on the local response diagram.

11. The apparatus of claim 10, wherein the processor is further configured to:
obtain the local feature blocks by dividing the first depth feature or a third depth feature extracted from the first depth feature; and
obtain the local response diagram based on correlations between the second depth feature or a fourth depth feature extracted from the updated second depth feature and the local feature blocks.

12. The apparatus of claim 11, wherein the processor is further configured to divide the first depth feature or the third depth feature based on any one of the local feature blocks not overlapping, the local feature blocks overlapping, and a preset block distribution.

13. The apparatus of claim 11, wherein the processor is further configured to:
obtain local sub-response diagrams based on the correlations between the second depth feature or the fourth depth feature and the respective local feature blocks; and
obtain the local response diagram by synthesizing the local sub-response diagrams.

14. The apparatus of claim 13, wherein the processor is further configured to:
classify the local feature blocks into target feature blocks and background feature blocks; and
obtain the local response diagram by synthesizing the local sub-response diagrams based on a result of the classification.

15. The apparatus of claim 14, wherein the processor is further configured to classify the local feature blocks into the target feature blocks and the background feature blocks based on overlap ratios of the respective local feature blocks to a temporary bounding box.

16. The method of claim 13, wherein the output bounding box information comprises coordinate offsets between coordinates of the center of a temporary bounding box included in the temporary bounding box information and coordinates of the center of an output bounding box and a size offset between the size of the output bounding box and a preset size; and
the processor is further configured to:
output the temporary bounding box information as the output bounding box information, in response to a sum of absolute values of the coordinate offsets being greater than a threshold, and
output a result of adding the coordinates of the center of the temporary bounding box and the coordinate offsets and a result of adding the size of the temporary bounding box and the size offset as the output bounding box information, in response to the sum of absolute values of the coordinate offsets being less than or equal to the threshold.

17. The apparatus of claim 10, wherein the obtaining of the local feature blocks is based on the first depth feature and the temporary bounding box.

18. An apparatus, the apparatus comprising:
a processor configured to:
extract a second depth feature map, for an object, from a current image;
acquire a temporary bounding box based on the second depth feature map and a first depth feature map, corresponding to the object, extracted from a reference image;
determine an updated second depth feature map based on the temporary bounding box and the second depth feature map;
determine local feature blocks of the first depth feature map based on the temporary bounding box and the first depth feature map; and
acquire a bounding box for the object in the current image based on the updated second depth feature map and the local feature blocks.

19. The apparatus of claim 18, wherein the determination of the updated second depth feature map includes a clipping of the second depth feature map based on the temporary bounding box, and/or wherein the local feature blocks of the first depth feature map are determined by a clipping of the first depth feature map based on the temporary bounding box.

20. The apparatus of claim 18, wherein, for the acquiring of the bounding box for the object in the current image, the processor is configured to:
determine a correlation based on the updated second depth feature map and the local feature blocks of the first depth feature map; and
acquire the bounding box for the object in the current image based on the determined correlation.

21. The apparatus of claim 18, wherein, for the acquiring of the temporary bounding box, the processor is configured to:
determine a correlation based on the second depth feature map and the first depth feature map; and
acquire the temporary bounding box based on the determined correlation.

* * * * *